United States Patent

Powsey

[15] 3,686,914
[45] Aug. 29, 1972

[54] METHOD OF SETTING TUBULAR FASTENERS

[72] Inventor: Eric Powsey, Lichfield, England

[73] Assignee: Linread Limited, Birmingham, England

[22] Filed: Aug. 28, 1970

[21] Appl. No.: 68,043

Related U.S. Application Data

[62] Division of Ser. No. 673,743, Oct. 9, 1967, abandoned.

[30] Foreign Application Priority Data

Oct. 12, 1966  Great Britain..........45,671/66

[52] U.S. Cl. ........................................72/114, 85/70
[51] Int. Cl. ..............................................B21j 15/04
[58] Field of Search ..............72/391, 114; 85/70, 71; 29/526, 523

[56] References Cited

UNITED STATES PATENTS

| | | |
|---|---|---|
| 2,588,907 | 3/1952 | Colley........................72/391 |
| 2,641,378 | 6/1953 | Wilt............................72/391 |
| 3,236,143 | 2/1966 | Wing............................85/70 |
| 3,257,889 | 6/1966 | Fischer.........................85/70 |
| 3,263,466 | 8/1966 | Shackelford.................72/114 |

FOREIGN PATENTS OR APPLICATIONS

| | | |
|---|---|---|
| 613,882 | 12/1948 | Great Britain.................85/70 |
| 667,048 | 2/1952 | Great Britain.................85/70 |
| 993,740 | 7/1951 | France..........................85/70 |

*Primary Examiner*—Charles W. Lanham
*Assistant Examiner*—Gene P. Crosby
*Attorney*—Wenderoth, Lind & Ponack

[57] ABSTRACT

A tubular fastener is positioned on an upsetting tool. The tool is operated to retract a mandrel thereof axially with respect to an anvil thereof. This applies an axial force to the fastener, thus causing the mouth thereof to flare outwardly to form a rivet head. Further outward flaring is restricted while continuing the application of the axial force. This causes an unthreaded portion of the fastener to bulge outwardly.

2 Claims, 6 Drawing Figures 3,686,914

ERIC POWSEY,
INVENTOR
By Wenderoth, Lind & Ponack
Atty's

METHOD OF SETTING TUBULAR FASTENERS

CROSSREFERENCE TO RELATED APPLICATION

This is a division of application Ser. No. 673,743, filed Oct. 9, 1967, now abandoned.

BACKGROUND OF INVENTION

Tubular fasteners are known which comprise a tubular body of substantially uniform external diameter having at one end a head formed by a peripheral flange, a portion of the bore remote from the head being of reduced internal diameter and having a screw thread formed therein. Such fasteners are known for use as so-called blind rivets or as rivet bushes.

In use such tubular fasteners are threaded onto an externally screw-threaded mandrel of an upsetting tool so that the peripheral head flange is brought into engagement with an anvil of the tool. The body of the fastener thus threaded onto the mandrel is inserted into aligned holes in two or more components to be riveted so that the head-forming flange lies against one of the components. The tool is then operated to retract the mandrel axially with respect to the anvil, thus applying an axial force to the fastener so to cause the unthreaded portion of the body to collapse by outward bulging in order to form a flange opposed to the head, the components being held between said head and flange. Upon subsequent unthreading of the mandrel from the screw-threaded portion of the bore, the screw-threading in the bore is available to receive if desired a screw or bolt whereby other items may be attached to the riveted components.

Further, if desired, such a tubular fastener may be used as a rivet bush, or blind fitting anchor nut, being inserted in one hole in a single component.

It has previously been usual to form the head-forming peripheral flange as either a flat head or a countersunk head, and to use a fastener having one of these two forms of head depending on the particular requirements of the riveting operation, the choice being dictated by whether the head may be left standing proud of the face of the riveted components or must be flush with the face, being received in a countersinking in the outer component.

OBJECTS AND BRIEF DESCRIPTION OF INVENTION

With this background in mind, it is a principal object of the present invention to provide a method of setting a tubular fastener by a blind riveting operation which may be employed to produce either a flared or a countersunk rivet.

It is a further object of the present invention to provide such a method wherein the head is formed during the process of setting the fastener.

It is yet a further object of the present invention to provide such a method the use of which improves the efficiency and reduces the cost of riveting.

These objects are achieved in accordance with the present invention by positioning a tubular fastener on an upsetting tool, the tubular fastener being constituted by an unflanged tubular body member of substantially uniform external diameter from end to end throughout the length of the fastener, the body member having a bore of which a portion adjacent one end is of reduced internal diameter and is internally screw-threaded, the bore having a mouth at the other end of the body member remote from the screw-threaded portion, and the unthreaded portion of the body member being capable of collapsing by outward bulging, and the mouth of the bore being internally coned, the upsetting tool comprising a threaded mandrel inserted from the said other end of the body member into the bore and engaged with the screw-thread, and an anvil having an annular generally inwardly concave pressure-applying face which engages the mouth of the bore at the said other end of the fastener body member. The tool is then operated to retract the mandrel axially with respect to the anvil so to apply to the fastener an axial force causing the mouth end of the body member to flare outwardly over the pressure-applying face of the anvil and thereby form a head at the other end of the fastener. Continued application of axial force causes the unthreaded portion of the body member to collapse by outward bulging.

Brief DESCRIPTION OF THE DRAWINGS

The invention will be further described with reference to the accompanying drawings in which.

DETAILED DESCRIPTION OF THE INVENTION

Figure 1:
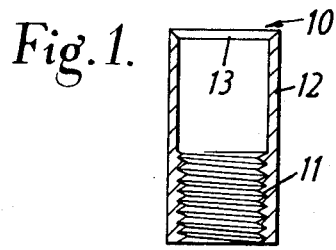
FIG. 1 is a view in axial section of one form of a tubular fastener for use in accordance with the present invention.

Referring to FIG. 1, the tubular fastener 10 there shown is adapted for use as a blind rivet or a rivet bush and has a constant outside diameter throughout its length, and includes an internally screw-threaded portion 11 at one end having a wall thickness greater than at portion 12 which portion 12 may be produced as a counter-bore. The mouth of the counter-bore is internally coned as indicated at 13.

Figure 2:
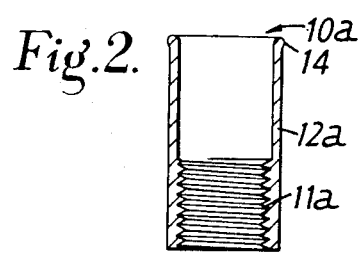
FIG. 2 is a view similar to FIG. 1 showing an alternative form of a fastener for use in accordance with the present invention.

The fastener 10a shown in FIG. 2 includes internally screw-threaded portion 11a and counter-bore 12a, but the mouth 14 of the counter-bore 12a is flared slightly so that both the internal and external diameters of the fastener 10a are increased slightly in the vicinity of the mouth.

The tubular fasteners 10 and 10a may be produced in any suitable malleable or deformable material, such as a heat-treated aluminum alloy.

Figure 3:
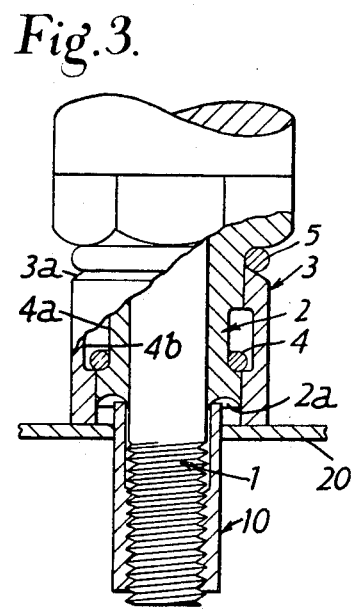
FIG. 3 is an elevational view, partly in section, showing the rivet of FIG. 1 in position on the mandrel of an upsetting tool having a modified anvil for use in accordance with the present invention, prior to upsetting of the fastener.

FIG. 3 shows details of the mandrel/anvil assembly of an upsetting tool which otherwise is of known construction and is not further illustrated. The mandrel 1 is axially movable within the anvil 2. A sleeve 3 is mounted on the anvil 2, and is axially movable with respect to the anvil, being removably retained on the anvil in any suitable manner such as by an O-ring 4 of rubber or other resilient material which is received in part within an annular recess 4a formed externally of the anvil 2 and an annular recess 4b formed internally of the sleeve 3. The pressure-applying face 2a of the anvil 2 is annular, and is relieved or recessed to present a generally inwardly concave face to the mouth of the fastener 10.

The sleeve 3 is biased to project axially outwardly beyond the pressure-applying face 2a of the anvil by suitable means illustrated as an O-ring 5 of rubber or other resilient material which is positioned in tension on the anvil 2 and cooperates with a beveled edge 3a of the sleeve 3.

The sleeve 3 is proportioned so that the O-ring 5 will normally cause the face 2a of the anvil to stand well clear of the face of the component 20 into which the fastener 10 is to be set. This is clearly shown in FIG. 3, the distance between the face 2a and the component 20 determining the length of the fastener body protruding which is necessary to form a flat type of head.

On operating the upsetting tool, an axial force is applied between the mandrel 1 and the anvil 2 and initial movement of the mandrel 1 draws the coned mouth of the fastener 10 against the radially inner edge of the concave anvil face 2a to initiate a head flaring operation, the mouth end of the tubular fastener flowing smoothly outwards as the remainder of the fastener is pulled through the hole in the component 20 by the mandrel. The sleeve 3 moves axially on the anvil 2, due to the forces applied, and the O-ring 5 is extended and rolls over the beveled edge 3a of the sleeve.

Figure 4:
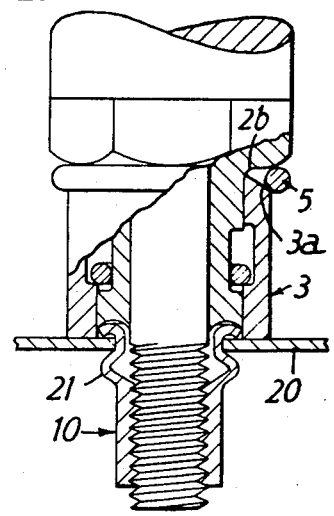
FIG. 4 is a view similar to FIG. 3 showing the parts at the conclusion of the upsetting operation and the formation of a flat head on the fastener.

The head form is complete when as shown in FIG. 4 the flared edge of the fastener 10 reaches the containing bore of the sleeve 3, and a normal increasing load at this stage completes the stroke of the mandrel causing the counter-bored portion of the fastener to bulge or upset at 21 in typical fashion and thus hold the fastener firmly in position.

With the upsetting axial force between mandrel and anvil released, the O-ring 5 contracts against the beveled edge 3a of the sleeve, positioning it outwards ready for the next upsetting operation with a further fastener.

Figure 5:
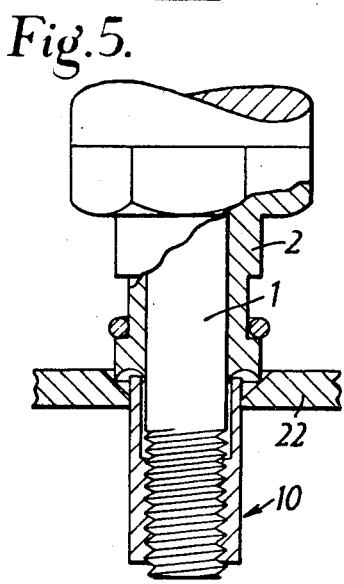
FIGS. 5 and 6 are views similar respectively to FIGS. 3 and 4 showing the setting of the fastener with a flush or countersunk head.
Figure 6:
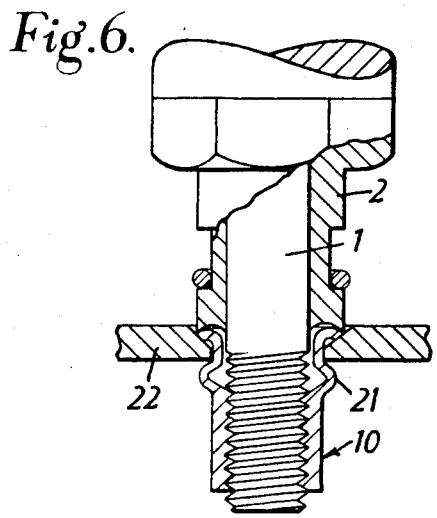

For countersunk work the anvil sleeve 3 is removed, the fastener threaded onto the mandrel in the usual manner and inserted into a countersunk hole in the component 22 shown on FIG. 5. As the mandrel is withdrawn axially into the anvil, the head flares as before, but now the wall of the countersink provides the stop which controls the head diameter and ensures that a flush condition is always obtained. Continued movement of the mandrel now upsets the fastener as described previously and the final form is shown in FIG. 6.

What is claimed is:

1. A method of setting a tubular fastener by a blind riveting operation, which comprises positioning a tubular fastener on an upsetting tool, the tubular fastener being constituted by an unflanged tubular body member of substantially uniform external diameter from end to end throughout the length of the fastener, the body member having a bore of which a portion adjacent one end is of reduced internal diameter and is internally screw-threaded, the bore having a mouth at the other end of the body member remote from the screw-threaded portion, and the unthreaded portion of the body member being capable of collapsing by outward bulging, and the mouth of the bore being internally coned, the upsetting tool comprising a threaded mandrel inserted from the said other end of the body member into the bore and engaged with the screw-thread, and an anvil having an annular generally inwardly concave pressure-applying face which engages the mouth of the bore at the said other end of the fastener body member; placing said tool with the fastener thereon in a countersunk hole with said mouth in the countersunk portions of the hole; operating the tool to retract the mandrel axially with respect to the anvil so as to apply to the fastener an axial force causing the mouth end of the body member to flare outwardly over the pressure-applying face of the anvil and thereby form a head of the countersunk type at the said other end of the fastener; restricting further outward flaring of said other end of the fastener body when the head form is complete by cooperation between said anvil and the wall of said countersunk hole in which the head form is produced; and continuing the application of the axial force to cause the unthreaded portion of said body member to collapse by outward bulging.

2. A method of setting a tubular fastener by a blind riveting operation, which comprises positioning a tubular fastener on an upsetting tool, the tubular fastener being constituted by an unflanged tubular body member of substantially uniform external diameter from end to end throughout the length of the fastener, the body member having a bore of which a portion adjacent one end is of reduced internal diameter and is internally screw-threaded, the bore having a mouth at the other end of the body member remote from the screw-threaded portion, and the unthreaded portion of the body member being capable of collapsing by outward bulging, and the mouth of the bore being internally coned, the upsetting tool comprising a threaded mandrel inserted from the said other end of the body member into the bore and engaged with the screw-thread, an anvil having an annular generally inwardly concave pressure-applying face which engages the mouth of the bore at the said other end of the fastener body member, and a sleeve coaxially positioned around said anvil, and being capable of axial movement, the sleeve being biased to project axially beyond the pressure-applying face of the anvil; operating the tool to retract the mandrel axially with respect to the anvil so as to apply to the fastener an axial force causing the mouth end of the body member to flare outwardly over the pressure-applying face of the anvil and thereby form a head of the flat type at the said other end of the fastener; restricting further outward flaring of said other end of the fastener body when the head form is complete by said sleeve positioned coaxially around said anvil; and continuing the application of the axial force to cause the unthreaded portion of said body member to collapse by outward bulging.

* * * * *